(No Model.)
A. SCHÜTZ, E. SCHULTES & R. PLÜCKER.
NUT AND BOLT.
No. 389,603. Patented Sept. 18, 1888.
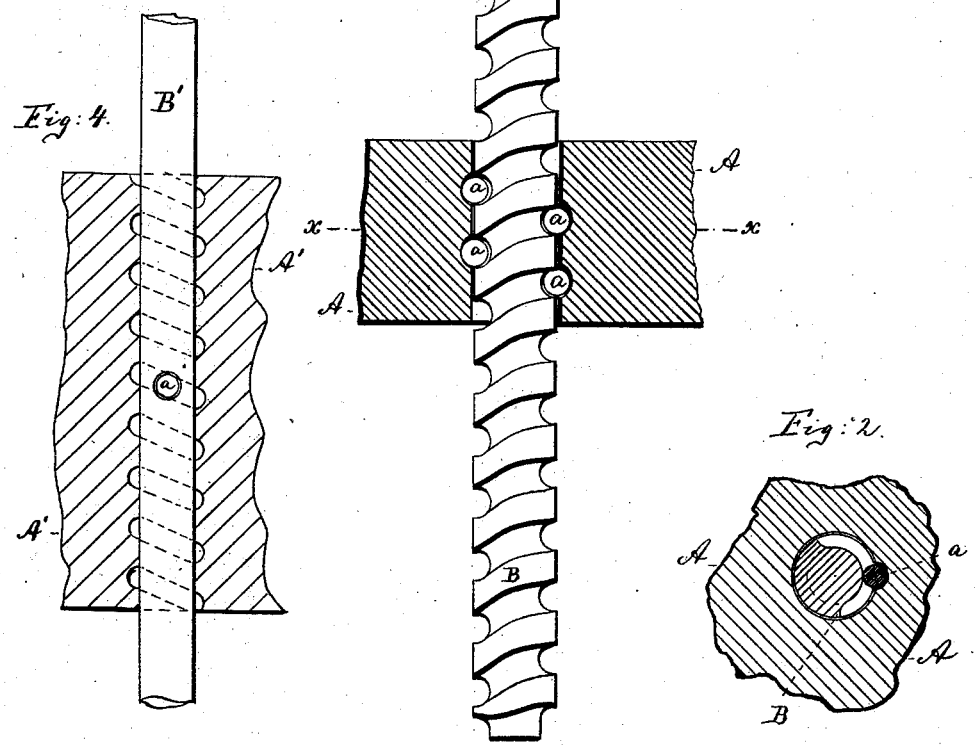

UNITED STATES PATENT OFFICE.

ANTON SCHÜTZ, EDUARD SCHULTES, AND RICHARD PLÜCKER, OF SOLINGEN, GERMANY.

NUT AND BOLT.

SPECIFICATION forming part of Letters Patent No. 389,603, dated September 18, 1888.

Application filed February 27, 1888. Serial No. 265,492. (No model.)

*To all whom it may concern:*

Be it known that we, ANTON SCHÜTZ, EDUARD SCHULTES, and RICHARD PLÜCKER, all of Solingen, Germany, have invented a new and useful Improvement in Nuts, of which the following is a specification.

This invention relates to a nut in which the screw-threads are replaced by balls received by sockets in the nut and projecting between the threads of the screw.

The invention consists in the various features of improvement, more fully pointed out in the claim.

In the accompanying drawings, Figure 1 is a longitudinal central section of a nut provided with our improvement, showing it in engagement with a screw. Fig. 2 is a cross-section on line $x\ x$, Fig. 1. Fig. 3 is a longitudinal section of the nut without the screw. Fig. 4 is a longitudinal central section, partly in side view, of a modification.

The letter A represents a nut provided at proper places with sockets that receive outwardly-projecting balls $a$. The nut should be made with a smooth bore, excepting for these sockets, that are placed at points that would be occupied by the thread of an ordinary nut.

The balls $a$ may be made of glass, steel, or other suitable material. They enter between the threads of the screw B, and if the screw is revolved the balls will turn in their sockets and constitute rollers traveling along the screw. Thus but little friction will take place. Any suitable number of balls $a$ can be employed.

In Fig. 4 we have shown the screw B' provided with the sockets and with the balls $a$, while the nut A' has the screw-thread for engagement with said balls. Thus the arrangement is reversed and the screw, for the purpose of this invention, constitutes an equivalent of the nut.

The invention may also be applied to endless screws. It is deemed to be particularly useful for vises, punches, presses, and drills.

What we claim is—

A nut provided with sockets, in combination with balls $a$, received by said sockets and projecting out of the same, and with a bolt or rod grooved correspondingly with the nut, substantially as specified.

In testimony whereof we have signed this specification in the presence of two subscribing witnesses.

ANTON SCHÜTZ.
EDUARD SCHULTES.
RICHARD PLÜCKER.

Witnesses:
GUSTAVE ALBERT OELRICHS,
WM. D. WARNER.